Dec. 13, 1938.  E. C. HORTON  2,140,453
WINDSHIELD WIPER
Filed Nov. 5, 1935
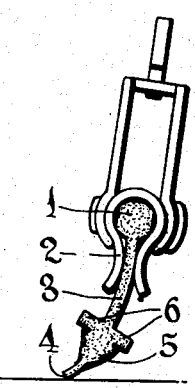
Fig. 2.
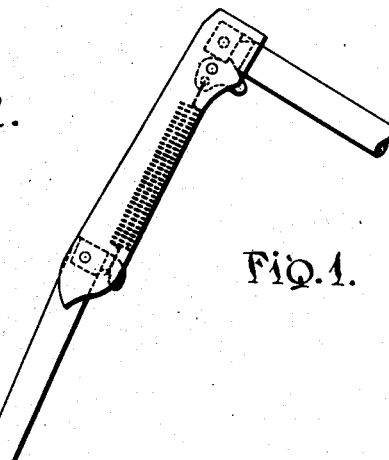
Fig. 1.
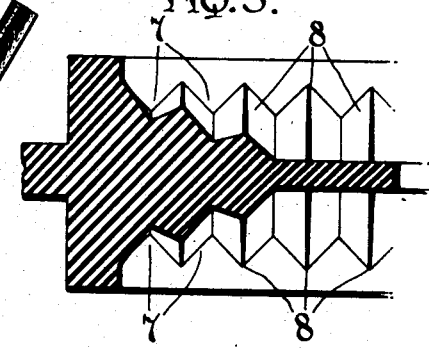
Fig. 5.
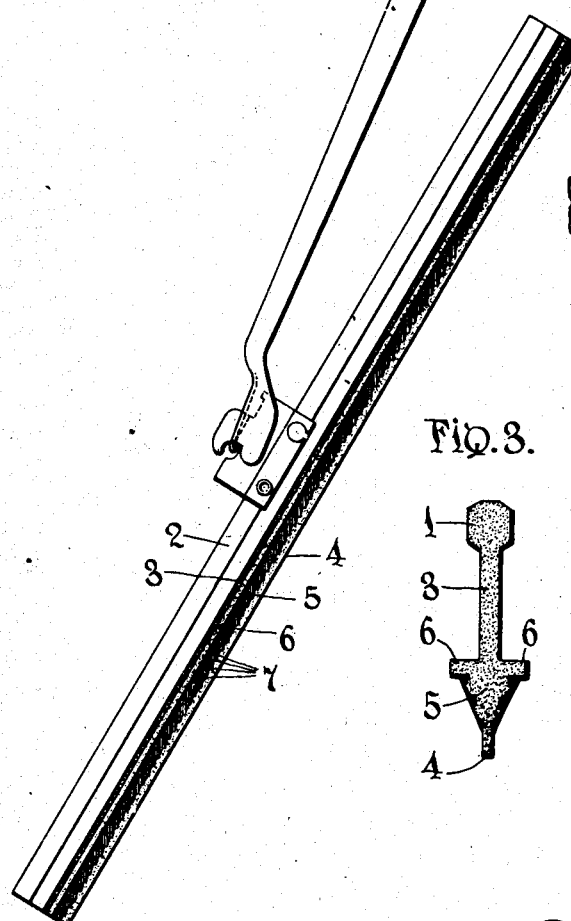
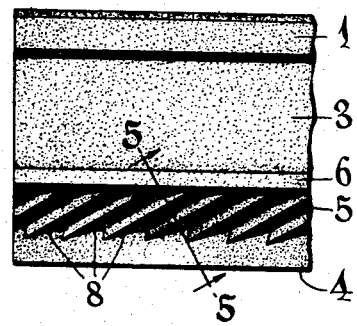
Fig. 3.  Fig. 4.
INVENTOR
Erwin C. Horton,
BY
Beau, Brooks, Buckley & Beau.
ATTORNEYS

UNITED STATES PATENT OFFICE 2,140,453

WINDSHIELD WIPER

Erwin C. Horton, Hamburg, N. Y., assignor to Trico Products Corporation, Buffalo, N. Y.

Application November 5, 1935, Serial No. 48,370

8 Claims. (Cl. 15—245)

This invention relates to a windshield wiper adapted for operation over a motor vehicle windshield or window by means of a power drive, and wherein the wiper is resiliently pressed by an actuating arm against the window.

Attempts have heretofore been made to provide a satisfactory molded or extruded type of blade, but when wiping a window glass with such a blade during intervals wherein the surface was only partially wet, as in a light shower, the rubber wiping element would cling to the glass and cause the main wiping edge to roll under and out of contact with the glass. This impaired the wiping or cleaning efficiency of the blade and even caused the metal holder to scratch the glass.

In the multi-ply type of blade, as set forth in the Oishei and Hueber Patent No. 1,659,496, separable wiping edges are provided to carry away the moisture. In practice a certain amount of residual moisture would be retained by the several plies so as to wet or lubricate a partially dried surface for obtaining a better wiping action during a light shower or when the rain is letting up.

The present invention has for its object to provide a molded or extruded type of rubber wiping element for windshield wipers in which means are provided to retain a certain amount of moisture for gradual feeding to the wiping edge to moisten the same for smoother and more efficient functioning of the wiper when the glass is partially dry, whereby the wiper action is continued, by the light cleaner motor, undiminished for a longer period of time. The invention further has for its object to provide a wiping edge of a readily flexible nature wherein the point of flexure is brought down close to the point of wiping contact whereby the desired firmness in the wiping is maintained while permitting the use of a more flexible wiping edge for a cleaner and finer wiping action. Furthermore, the invention has for its object to provide a wiping element which will efficiently and effectively clear the windshield of raised vision obscuring matter thereon as the wing element is moved back and forth thereover.

In the drawing

Fig. 1 is a side elevation of a wiper formed in accordance with the preferred embodiment of the present invention;

Fig. 2 is an end elevation of the wiper showing the same in wiping contact with a surface;

Fig. 3 is an end view of the rubber wiping element of the wiper;

Fig. 4 is a fragmentary side elevation of the wiping element; and

Fig. 5 is a diagonal section through the wiping element taken about on line 5—5 of Fig. 4.

In proceeding in accordance with the present invention, the wiping element comprises a strip-like body having an anchoring bead 1 extending along one margin and which the reinforcing holder 2 embraces. A flexible web portion 3 extends outwardly from the anchoring portion 1 beyond the sides of the holder and supports a wiping edge 4 along the outer marginal portion. Preferably, this wiping edge is relatively thinner, so as to have a flexing action independent of but supplemental to the web portion 3. The thin wiping edge 4 is joined to the web portion 3 by a moisture holding enlargement 5. The wiping element is formed either through molding or extrusion of rubber or some like composition which will flex for proper wiping action and tend to cling to the surface when dry or only partially wet. In wiping action the web portion 3 will flex over the sides of the holder 2 for support thereby and, by reason of the enlargement 5, the thin wiping edge 4 will supplement the bending action by an independent flexing of its own, as shown in Fig. 2.

The enlargement 5 is provided with lateral shoulders 6 extending outwardly from opposite sides of the web portion 3 for coming in contact with the glass under abnormal conditions. Under normal wiping conditions the thin edge 4 will efficiently clean the window surface of moisture as it laps over the surface back and forth. However, when the window surface is partially wet or after the rain has let up, the rubber wiping edge 4 of the windshield cleaner will cling or adhere to the window surface and tend to pull the wiper down onto the glass, even to the extent of causing its metal holder to come into contact with the glass and scratch the same. Furthermore, the driving motor of the windshield cleaner is usually operated by suction or low pressure. The operating pressure fluctuates and at times is hardly sufficient to operate the wiper over a moist surface. With the surface becoming dry, or only partially wet, an added burden is placed upon the cleaner motor so that the latter will be arrested and the wiper fail to continue its functioning.

According to the present invention, means are provided to lubricate or maintain a wet surface for a more efficient wiping action over a longer period of time as the surface becomes drier or when it is only wet in spots. According to the present showing, which illustrates the preferred embodiment of the invention, a series of water collecting channels 7 are counter-sunk in the sides of the enlargement, such channels being defined by ribs 8 which are preferably so designed as to avoid contact with the glass while at the same time serve to collect water through capillary attraction, as the moisture builds up in advance of the wiping edge. These water collecting channels 7 are disposed above the wiping edge 4 and preferably extend toward the same so that the moisture therein will run toward the edge or collect at the lower end of the channels adjacent to the wiping edge. As the wiper moves over a partially wet surface so that the rubber wiping edge 4 will begin to cling to the glass and pull the enlargement 5 down closer to the glass, the collected beads of water in the lower ends of the channel will move off onto the glass surface and serve to lubricate the latter for easy passage of the wiping edge 4 thereover. As the wiper moves over the surface, the rain drops collecting on the glass will have some of their moisture taken up by the channels 7 for being spread thereby over the glass, as occasion may require, to more completely coat the surface with a thin film of moisture. This will serve to lighten the load on the small windshield cleaner motor so that the wiper will be reciprocated at a practical speed for a more efficient wiping action.

The drawing illustrates the ribs 8 as extending diagonally or at an angle to the wiping edge 4 and terminating above the same so as to permit the latter to readily yield and flex for normal wiping contact. These ribs are spaced well within the converging planes including the shoulders 6 and the wiping edge 4 so that normally they will not contact the glass surface should either shoulder 6 be brought down thereon. This will preserve the lubricating moisture supply against early depletion. The shoulders 6 will, therefore, serve to support the adjacent portions of the channels 7 off the glass and incidentally hold the metal holder from contact therewith.

In the illustrated embodiment the ribs extend at an angle to the wiping edge 4 and while they are normally set inwardly from the converging planes of shoulders 6 and the wiping edge, nevertheless they are exposed to contact raised matter on the windshield. For instance, when removing insects or snow from the glass the ribs will act thereon with a shearing action to cut or break down the vision obscuring matter to more effectively accomplish its removal by the trailing wiping edge 4. At the beginning of each stroke the blade will rock over about its wiping edge and present the side ribs 8 to act in advance of the trailing wiping edge for cutting into and breaking down any hardened vision obscuring matter on the glass whereby such wiping edge may perform more efficiently.

What is claimed is:

1. A window wiper having a rubber wiping element provided with a flexible wiping edge, and water collecting recesses formed in the rubber wiping element and arranged above its wiping edge for receiving and carrying a supply of moisture as it collects on the glass surface in advance of the wiping edge, said recesses having opposing wall portions for directing the collected moisture toward the wiping edge to lubricate the glass surface in advance of the wiping edge when the latter begins to cling to the surface through an insufficient wetting thereof.

2. A window wiper comprising a strip like rubber body adapted to be mounted for rocking movement on an actuating arm to assume a dragging position at the beginning of each stroke, said body having a wiping edge portion with adjoining side faces, said side faces having ribs extending toward the wiping edge portion at an angle thereto, the ribs being exposed to contact with raised matter on an associated windshield for acting thereon substantially lengthwise of the ribs and in advance of the wiping edge portion so as to break down such raised matter for subsequent removal by the wiping edge portion.

3. A window wiper comprising a squeegee body adapted to assume a dragging position at the beginning of each stroke and having side face portions with slanting ribs extending at an acute angle to the longitudinal axis of the squeegee body, said ribs being exposed to contact raised matter on an associated windshield and for movement thereover substantially lengthwise of the ribs to act on the raised matter for loosening the same.

4. A window wiper having a channeled holder and a wiping element, said wiping element provided with a flexible wiping edge and an enlargement adjacent said wiping edge provided with recesses to collect moisture from the surface being wiped for subsequent discharge to the wiping edge when the latter abnormally clings to the surface because of an insufficient wetness thereof, said enlargement with its moisture collecting recesses projecting beyond the sides of the channeled holder whereby it exposes the recesses to the moisture as it collects and builds up in advance of the wiping edge.

5. A window wiper having a wiping element provided with a flexible wiping edge and an adjacent enlargement having laterally extending shoulders above the wiping edge, the side portions of the enlargement intermediate the shoulders and wiping edge being set inwardly from the converging planes which include said shoulders and wiping edge, and being provided with water collecting and holding means adapted for wetting the surface when the wiping edge abnormally clings to the surface.

6. A window wiper having a wiping element provided with a flexible wiping edge and an adjacent enlargement having laterally extending shoulders above the wiping edge, the side portions of the enlargement intermediate the shoulders and wiping edge being set inwardly from the converging planes which include said shoulders and wiping edge, and being provided with water collecting and holding channels slanting from adjacent the shoulders toward the wiping edge and opening thereonto.

7. A window wiper having a rubber wiping element provided with a flexible wiping edge and an adjacent enlargement with oppositely facing sides converging downwardly toward the wiping edge, each side being provided with a series of parallel channels inclining downwardly and opening onto the wiping edge for receiving moisture therefrom and discharging moisture thereon.

8. A window wiper having a channeled holder and a rubber wiping element embraced by the sides of the holder, said wiping element projecting beyond the embracing sides of the holder and formed with a flexible wiping edge and oppositely facing sides converging downwardly toward the wiping edge and disposed between the latter and the sides of the holder, such oppositely facing sides being provided with channels extending in a direction toward the wiping edge and defined by walls obstructing free flow of the collected moisture longitudinally of the wiper.

ERWIN C. HORTON.